(12) United States Patent
Mahmoud

(10) Patent No.: US 11,655,411 B2
(45) Date of Patent: May 23, 2023

(54) THERMOCHEMICAL COMPOSITION FOR WELL CLEANUP

(71) Applicant: King Fahd University of Petroleum and Minerals, Dhahran (SA)

(72) Inventor: Mohamed Mahmoud, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 17/707,676

(22) Filed: Mar. 29, 2022

(65) Prior Publication Data

US 2022/0220361 A1    Jul. 14, 2022

Related U.S. Application Data

(62) Division of application No. 16/657,168, filed on Oct. 18, 2019, now Pat. No. 11,326,090.

(51) Int. Cl.
*E21B 36/00*        (2006.01)
*C09K 8/528*       (2006.01)
(Continued)

(52) U.S. Cl.
CPC .............. *C09K 8/528* (2013.01); *C09K 8/032* (2013.01); *E21B 36/008* (2013.01); *E21B 37/00* (2013.01)

(58) Field of Classification Search
CPC .......... C09K 8/528; C09K 8/008; E21B 37/00
See application file for complete search history.

(56) References Cited

U.S. PATENT DOCUMENTS 10,844,278 B2 * 11/2020 Mahmoud ................ C09K 8/52
2003/0221832 A1    12/2003 Reddy
(Continued)

FOREIGN PATENT DOCUMENTS

CN        101671553 B      3/2012
WO        2013/160334 A1   10/2013

OTHER PUBLICATIONS

Dandan, et al. ; Experimental Study of in-situ Heat Generation in Heavy Oil Reservoirs and Upgrading Visbreaking Reaction : Sep. 10, 2012 ; Abstract Only ; 2 Pages.

*Primary Examiner* — Silvana C Runyan
(74) *Attorney, Agent, or Firm* — Oblon, McClelland, Maier & Neustadt, L.L.P.

(57) ABSTRACT

A well cleanup process involves removing an impermeable filter cake from a formation face with thermochemical and chelating agents to allow formation fluids to flow from a reservoir to a wellbore. The method may be used with oil and water-based drilling fluids with varied weighting agents, e.g., bentonite, calcium carbonate, or barite. Such thermochemical agents may involve two salts, e.g., $NO_2^-$ and $NH_4^+$, which, when mixed together, can generate pressure and heat, in addition to hot $H_2O$ and/or $N_2$. For example, the thermochemical agents may comprise $Na^+$, $K^+$, $Li^+$, $Cs^+$, $Mg^{2+}$, $Ca^{2+}$, and/or $Ba^{2+}$ with $NO_2^-$ and $NH_4^+$ with $F^-$, $Cl^-$, $Br^-$, $I^-$, $CO_3^{2-}$, $NO_3^-$, $ClO_4^-$, and/or $^-OH$. The thermochemical agents in combination with a chelator such as EDTA can removed the filter cake after 6 hours with a removal efficiency of 89 wt % for the barite filter cake in water based drilling fluid, exploiting the generation of a pressure pulse and heat which may disturb the filter cake and/or enhance barite dissolution and polymer degradation.

9 Claims, 8 Drawing Sheets

(51) Int. Cl.
    *E21B 37/00*     (2006.01)
    *C09K 8/03*     (2006.01)

(56) References Cited

U.S. PATENT DOCUMENTS

| | | |
|---|---|---|
| 2009/0048126 A1 | 2/2009 | Phatak |
| 2011/0005773 A1 | 1/2011 | Dusterhoft et al. |
| 2012/0145401 A1 | 6/2012 | Reyes |
| 2013/0210684 A1 | 8/2013 | Ballard |
| 2013/0213659 A1 | 8/2013 | Luyster |
| 2015/0361328 A1 | 12/2015 | Almutairi |
| 2016/0002521 A1* | 1/2016 | Dillon .................. C10M 173/00 507/201 |
| 2017/0101577 A1* | 4/2017 | Al-Dahlan ............... C09K 8/62 |
| 2017/0145289 A1 | 5/2017 | Ba Geri |
| 2019/0016945 A1 | 1/2019 | Mahmoud et al. |
| 2019/0100687 A1 | 4/2019 | Socci et al. |
| 2020/0123433 A1* | 4/2020 | Farmer .................. C10G 75/02 |

\* cited by examiner

THERMOCHEMICAL COMPOSITION FOR WELL CLEANUP

CROSS-REFERENCE TO RELATED APPLICATIONS

The present application is a Divisional of U.S. Pat. No. 11,326,090, having a filing date of Oct. 18, 2019.

STATEMENT REGARDING PRIOR DISCLOSURES BY INVENTOR(S)

Aspects of the present disclosure are described by the inventors in "Well Cleanup Using a Combined Thermochemical/Chelating Agent Fluids," which published online in *J. Energy Res. Techn.* 2019, 141, 102905 on May 8, 2019, which is incorporated herein by reference in its entirety.

BACKGROUND OF THE INVENTION

Field of the Invention

The present disclosure relates to formulations and methods for freeing oil well filter cakes from residues, particularly drilling fluid residues, particularly implementing thermochemical reactions to produce heat and/or pressure, preferably in combination with a solubilizing agent, such as a chelator, particularly for barite-containing fluids.

Description of the Related Art

The well cleanup process is the first stage in well completion operations. In well cleanup, the oil and/or gas (or water) well is cleaned of drilling fluid residue. The drilling fluid residue is formed during overbalanced drilling operations due to the difference between the hydrostatic drilling fluid pressure and the reservoir pressure. This pressure difference generally forms a drilling fluid residue on the formation face.

The drilling fluid residue is a thin, impermeable layer that can prevent the flow of oil and gas from the reservoir to the wellbore. The drilling fluid residue, i.e., impermeable thin layer or filter cake, should be removed during the well cleanup operations in order to allow the reservoir fluids to flow from the reservoir to the wellbore and then to the surface.

The drilling fluid, or components thereof, can also cause damage to the reservoir due to the invasion of its base fluid (water or oil) and weighting materials, polymers, etc. These components of the drilling fluid, such as weighting materials, base fluid, polymers, etc., will generally flow through the reservoir until the filter cake is formed. The flow of these components to the reservoir can form a layer of reduced permeability, called a skin, around the wellbore. In addition to skin damage, other damaging mechanisms can be introduced during the drilling process, such as wettability alteration in the near-wellbore zone, formation of emulsion, and clay swelling.

Well cleanup problems can be more difficult or severe in horizontal wells compared to vertical wells, which can be attributed to longer contact times between the drilling fluid and the reservoir section during horizontal drilling. Several studies have indicated that reservoir productivity can be affected, e.g., diminished, due to drilling fluid residue damage.

While drilling vertical and horizontal wells, the drilling fluid can form a rigid filter cake on the formation face. The drilling fluid is typically contaminated with fine particles from the drilled-rocks. These fine particles promote filter cake formation and generally become major constituents of the filter cake.

Several studies have shown that the filter cake formed on the formation face is different from that formed in the laboratory. The effect of the drilled-rock fine particles is not always considered or adequately accounted for in the laboratory. Drilling fluid samples used in the laboratory to assess the formation damage risks of these fluids do not represent the actual situation in the field. Field samples of drilling fluids should preferably be used in the laboratory to assess the formation damage potential.

Drilling fluid cleaning equipment at the surface of a well usually cannot remove the contaminants encountered during the drilling process. Some of these contaminants may have the same size as the drilling fluid weighting materials, such as sand and calcite particles from the drilled formation. Drilling fluid samples collected from the field as well as simulations of actual drilling processes for a specific well have shown that the drilled formation solid content can reach 30% in the drilling fluid during drilling a horizontal lateral of 3000 ft. Such a situation will be more severe in longer laterals.

*J. Energy Resour. Technol.* 2016, 139(2), 022912 by Ezeakacha et al. (Ezeakacha) describes the effect of particle size in drilling fluid weighting materials on the filtration loss and filter cake in different sandstone rock outcrops. Ezeakacha does not consider the effect of rock mineralogy on the filter cake formation, neglecting the presence of the drilled-cuttings effect on the drilling fluid and filter cake formation as well. Ezeakacha reports that the integrity of the filter cake is controlled by the particle size distribution of the weighting materials as well as the tested rock permeability.

Different additives can be included in the drilling fluid formulation to reduce infiltration to the reservoir section and minimize the risk of damage to the formation. *J. Energy Resour. Technol.* 2018, 140(5), 052903 by Adewole et al. (Adewole) describes using date pits to improve drilling fluid rheological properties and reduce filtrate loss to the formation. Adewole reports that a concentration range of 15 to 20 wt. % of date pits can give useful filter cake thicknesses and improve the fluid rheology.

Hydrochloric acid (HCl) has been extensively used in the art to clean the wellbore and remove filter cake damage. Horizontal well cleanup using HCl is a challenging process because of the uncontrolled reaction and inefficiency in the acid placement process in long horizontal wells.

Water based-filter cakes can include polymer materials. Different techniques have been developed to remove the polymer materials. Oxidizers and enzymes have been used, but their efficiency typically degrades when mixed with acids, and most polymer breakers are not stable at high temperatures. Esters, encapsulated acids, organic acids, or acid precursors have been used to remove the filter cake formed by water-based drilling fluids. These acids undergo controlled reaction and can be used in long horizontal wells to clean the well after drilling operations, but limitations associated with such acids, including temperature stability and dissolution capacity of calcite based filter cakes, remain.

HCl acid has also been investigated in a jetting mode rather than soaking mode. Mechanical jetting and chemical jetting, using HCl, have been attempted as a means to remove calcium carbonate filter cake. Acid jetting has been reported to perform better than acid dissolution because acid jetting can be used to clean long laterals and acid dose, rate, and velocity can be controlled. The contribution of mechanical jetting of the acid has been reported to perform better than acid dissolution in restoring the well productivity.

The previously mentioned acids were introduced for managing filter cakes with water containing calcium carbonate. These formulations have not been successful when barite (also "baryte"), i.e., a white or colorless mineral having barium as a main source ($BaSO_4$), the barite group including barite, celestine (strontium sulfate), anglesite (lead sulfate), and anhydrite (calcium sulfate) with barite and celestine forming a solid, $(Ba,Sr)SO_4$, is used as a weighting material. Barite is insoluble in a variety of acids, and extensive research has been performed to solve the problem of barite removal in water base drilling fluids.

Chelating agents, such as ethylenediaminetetraacetic acid (EDTA) and diethylenetriaminepentaacetic acid (DTPA), have been used to remove barite filter cakes. Converters, such as potassium carbonate, have been added to such chelating agents to maximize the removal efficiency. Removal efficiencies of up to 95% have been reported using one or more converters along with one or more chelating agents, compared to 65% without the use of converter. The barite conversion process using chelating agents and converters has been found to be effective for removing water-based barite filter cakes. The barite conversion process has been found to be non-corrosive to well tubulars under high pressure, high temperature (HPHT) conditions.

In long horizontal and maximum reservoir contact wells, efforts have been made to address the issues of uncontrolled and unwanted reactions by so-called "self-destructive" methods. In a self-destructive method, the drilling fluid includes an encapsulated formulation that decomposes after the formation of the filter cake. The decomposition of the removal formulation can be homogenous along the horizontal lateral and can clean the entire length of the well. A problem of self-destructive methods is that achieving the correct design of the capsules and the time at which the capsules should decompose, which often cannot be controlled.

Reservoir intervals, in addition to sensitive formations, are usually drilled with oil base drilling fluids to avoid formation damage. The severity of formation damage is a function of the drilling fluid formulation, the reservoir rock(s), and fluid properties. In oil-based mud, the process of filter cake removal and well cleanup can be substantially different than that for water-based mud, because of oil residues in oil-based filter cakes. Oil films must be removed first, then the particles forming the filter cake should be water-wetted before the oil film removal, to allow for direct contact between the removal fluid and the solid particles. Water-wetting surfactants and solvents, such as mutual solvents like ethylene glycol monobutyl ether, have been used to water-wet filter cakes and remove oil films that cover the solid particles. Delayed breakers or removers, such as organic acids, have been used to remove the oil base mud filter cake from different reservoirs. Micro-emulsions have likewise been used to clean oil and gas wells drilled with oil-based drilling fluids.

High clay content sandstone reservoirs are particularly sensitive to water-based drilling fluids. Therefore, oil-based fluids are typically used to drill high clay content sandstone formations. Well cleanup in these types of formations is typically conducted using single stage microemulsion treatment in horizontal wells. Customary durations for such treatments are 24 hours, reaching removal efficiencies up to 97%. Microemulsions have been found efficient for cleaning wells drilled with synthetic oil-based fluids as well. Other additives, such as co-surfactants and surfactants, have been added to such micro-emulsions to remove both oil and water from the filter cake and from the near-wellbore area. An important parameter influencing the success of micro-emulsion treatments is the average droplet size of the microemulsion.

Most known methods for well cleanup with oil-based or water-based drilling fluids have issues either in handling, design, or injection. For example, mineral acids such as HCl risk corrosion, organic acids have incompatibility, solubility, and/or stability issues, micro-emulsions require careful design to clean wells efficiently, etc. Recent methods, such as employing chelating agents with catalysts, require several stages to clean wells due to incompatibilities of formulation ingredients.

CN 101671553 B to Zhu et al. (Zhu) discloses a gas producing solid-foam liquor drainage ball for a watered gas well, mainly consisting of ball A and ball B. Ball A contains, by weight: 100 to 150 parts of $NaNO_2$ and 10 to 30 parts of foaming agent, such as sodium dodecyl sulfonate or betaine. Ball B contains, by weight: 100 to 120 parts of $NH_4Cl$, 5 to 10 parts of foam stabilizer, such as hydroxypropyl guar gum, xanthan gum, or hydroxyethyl cellulose; 25 to 40 parts of catalyst, such as citric acid, salicylic acid, or tartaric acid; and 5 to 10 parts of ethylene diamine tetraacetic acid (EDTA). Zhu discloses a self-generation reagent chemical reaction equation of $NaNO_2 + NH_4Cl \rightarrow N_2\uparrow + NaCl + H_2O$. Zhu's materials are non-toxic and can produce non-toxic gas after reaction, allowing special high-pressure injection equipment to be avoided in oil field operations. Zhu's reagents react chemically in aqueous solution to generate nitrogen gas and a large number of bubbles, which reduces the liquid column density of the bottom hole effusion, thereby reducing the bottom hole pressure and helping the gas well to reduce the bottom hole effusion. Zhu does not disclose removing filter cakes from the wall of a wellbore in a subterranean formation.

WO 2013/160334 A1 by Nasr-El-Din et al. (Nasr-El-Din) discloses a one-step process comprising introducing into a subterranean formation containing a filter cake a composition containing between 1 and 40 wt % of a chelating agent, such as glutamic acid N,N-diacetic acid (GLDA), aspartic acid N,N-diacetic acid (ASDA), methylglycine N,N-diacetic acid (MGDA), and N-hydroxyethyl ethylenediamine-N,N', N'-triacetic acid (HEDTA), or salts of these, and having a pH of below 7, wherein in one step the filter cake is at least partly removed and the subterranean formation is treated. While Nasr-El-Din discloses EDTA as an optional chelating agent, Nasr-El-Din's method requires a pH of no more than 7, and Nasr-El-Din does not disclose thermochemical agents, let alone particular relative amounts of these to a particular chelating agent.

US 2013/0210684 A1 by Ballard (Ballard) discloses a method of removing a water-based filter cake from a wellbore, involving: contacting the filter cake with a mixture of a non-aqueous, polar solvent, preferably having a dielectric constant >15, e.g., monoethylene glycol (or propylene glycol or glycerine), and an agent to breakdown the filter cake, preferably an EDTA salt, in <5 wt. % water. Ballard relies on the low water content of the mixture to slow the degradation of the filter cake. Ballard reports the slow degradation to be surprisingly more effective by allowing more uniform removal of the filter cake and a more efficient use of the mixture, without the tendency to create local holes in the filter cake where the mixture could escape. Ballard's mixture typically contains >50 wt. % of the polar solvent and Ballard does not describes neither thermochemical agents.

US 2011/0005773 A1 by Dusterhoft et al. (Dusterhoft) discloses a method of treating a subterranean formation on a well bore at least partially having a filter cake by contacting at least a portion of the filter cake with a filter cake degradation fluid of a relative permeability modifier and allowing the relative permeability modifier to retain at least a portion of the filter cake degradation fluid in the well bore for a time sufficient to contact the filtercake and allowing the filter cake to degrade. Dusterhoft's relative permeability modifier is only limited to the capability to reduce the permeability of a subterranean formation to aqueous-based fluids without substantially changing its permeability to hydrocarbons, and in some embodiments may be a hydrophobically modified polymer. Although Dusterhoft discloses a list of optional acidic additives and a separate list of chelating agents, each including EDTA, Dusterhoft discloses neither thermochemical reagents, nor selecting any particular small molecule chelating agent, much less particularly relative molar ratios thereof.

U.S. Pat. No. 10,047,278 and US 2019/0016945 A1 by Mahmoud et al. (Mahmoud) discloses a fracturing fluid composition including a chelating agent, e.g., GLDA, and a polymeric additive comprising a copolymer of acrylamido-tert-butyl sulfonate and hydrolyzed polyacrylamide diluted in an aqueous base fluid, e.g., seawater, and a method of fracking a geological formation using the fracturing fluid composition. Mahmoud further discloses using the chelating agent glutamic diacetic acid, and optionally further agents (up to 15 wt. %) but does not particularly indicate selecting anything beyond glutamic diacetic acid. Mahmoud indicates that various ions may be present in the salt water, including nitrites, chlorides, ammonium, and sodium ions, but Mahmoud does not disclose targeted thermochemical agents.

US 2019/0100687 A1 by Socci et al. (Socci) discloses compositions and methods for degrading filter cakes and filter cake removal, from a subterranean borehole. Socci's composition has an unencapsulated peroxygen and a surfactant, which is allowed to remain in contact with the filter cake at a temperature above 165° F. (73.9° C.) for a period of time sufficient to degrade the filter cake, resulting in acidic conditions and eliminating any need for follow up acid treatments. Socci's peroxygens are sodium persulfate, potassium persulfate, and ammonium persulfate. Socci mentions optionally using a chelating agent, such as EDTA, but does not describe thermochemical agents, aside from mentioning ammonium chloride in brine.

*Sci. Techn. Rev.* 2012, 30(34), 36-40 by Yin et al. (Yin) discloses addressing heavy oil fluidity and viscosity problems with a chemical thermal and catalysis system including $NaNO_2$—$NH_4Cl$ at 4 mol/L. Yin reports that $NaNO_2$—$NH_4Cl$ can raise the sample temperature by 150° C. from an initial reaction temperature of 60° C., but Yin requires a fatty acid-nickel catalyst as a heavy oil viscosity reducer. Yin does not disclose a method of removing a filter cake from the wall of a wellbore in a subterranean formation.

In light of the above, a need remains for filter cake removal formulations and methods, particularly for subterranean and horizontal wellbores, and particularly using borites, while preferably avoiding the complex formulas and equipment of the art, such as employing thermochemical reagents alongside chelators in particular molar relationships, e.g., to generate pressure and heat in situ, and methods of making and using such formulations.

SUMMARY OF THE INVENTION

Aspects of the invention provide wellbore filter cake removal compositions which may comprise, in an aqueous solution at a pH of at least 10:1 to 75 g of an ammonium salt per 100 mL composition; 1 to 75 g of nitrite salt per 100 mL composition; and at least 20 g ethylenediamine tetraacetic acid per 100 mL composition. Such inventive formulations may be modified by any permutation of the features described herein, particularly the following.

The nitrite salt and the ammonium salt may be in a molar ratio in a range of from 1.175 to 1 to 1 to 1.175. The ammonium salt may be an ammonium halide and/or the nitrite salt may be an alkali metal salt. The ethylenediamine tetraacetic acid may comprise a potassium counterion per molecule.

Aspects of the invention provide methods of removal of filter cake mass from a wellbore wall in a subterranean formation using any permutation of the inventive composition(s) described herein. Such methods may comprise: introducing into a wellbore an aqueous composition onto a wellbore face coated with the filter cake mass; allowing the aqueous composition to reach a temperature in the wellbore sufficient to initiate an exothermic chemical reaction of the components of the aqueous composition and thereby cause a temperature and/or pressure surge at the wellbore face to disrupt the filter cake from the well bore face. The aqueous composition may comprise, at a pH of no less than 10: a first combination comprising a hydrated sulfate salt and guar or a polyacrylamide or a second combination comprising a nitrite salt and an ammonium salt; and at least 20 wt. % ethylenediamine tetraacetic acid, based on total aqueous composition weight. Such methods may be modified by any permutation of the features described herein In the second combination the ammonium salt and the nitrite salt may each be at a concentration in a range of from 0.5 to 15 M, particularly 1 to 5 M. The ammonium salt may be an ammonium halide. The nitrite salt may be an alkaline metal or alkaline earth metal nitrite. The nitrite salt may comprise $Na^+$, $K^+$, $Li^+$, $Cs^+$, $Mg^{2+}$, $Ca^{2+}$, and/or $Ba^{2+}$ with the nitrite salt. The ammonium salt may comprise $F^-$, $Cl^-$, $Br^-$, $I^-$, $CO_3^{2-}$, $NO_3^-$, $ClO_4^-$, $HSO_4^-$, $SO_4^{2-}$, $H_2PO_4^-$, $HPO_4^{2-}$, $PO_4^{3-}$, and/or $^-OH$ with the ammonium salt. At least 95 wt. % of the nitrite salt may be sodium nitrite, relative to the total nitrite salt weight. At least 95 wt. % of the ammonium salt may be ammonium chloride, relative to the total ammonium salt weight. A molar ratio of the ammonium salt to the nitrite salt may be in a range of from 1.175 to 1 to 1.175 to 1.

The first combination may be used and may comprise: the polyacrylamide; and an alkaline metal or alkaline earth metal sulfate with saturated hydration. The hydrated sulfate salt may comprise $Na^+$ and/or $Mg^{2+}$. The hydrated sulfate salt may comprise at least 95 wt. % $Na_2SO_4.10H_2O$, relative to total sulfate salt weight. The hydrated sulfate salt may comprise at least 95 wt. % $MgSO_4.7H_2O$, relative to total sulfate salt weight.

The ethylenediamine tetraacetic acid may be in a range of from 22.5 to 30 wt. % of the total aqueous composition weight. Each ethylenediamine tetraacetic acid molecule may comprise a potassium counterion.

The temperature in the wellbore may be in a range of from 50 to 150° C., prior to the introducing.

The wellbore may comprise a drilling fluid comprising at least 65 wt. %, relative to all drilling fluid solids, of barite. Inventive methods may achieve the removal of at least 85 wt. % of the filter cake mass within 6 hours. Inventive methods may be ones in which at least 95% of the removal of the filter cake mass achievable by the method is within 6 hours.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
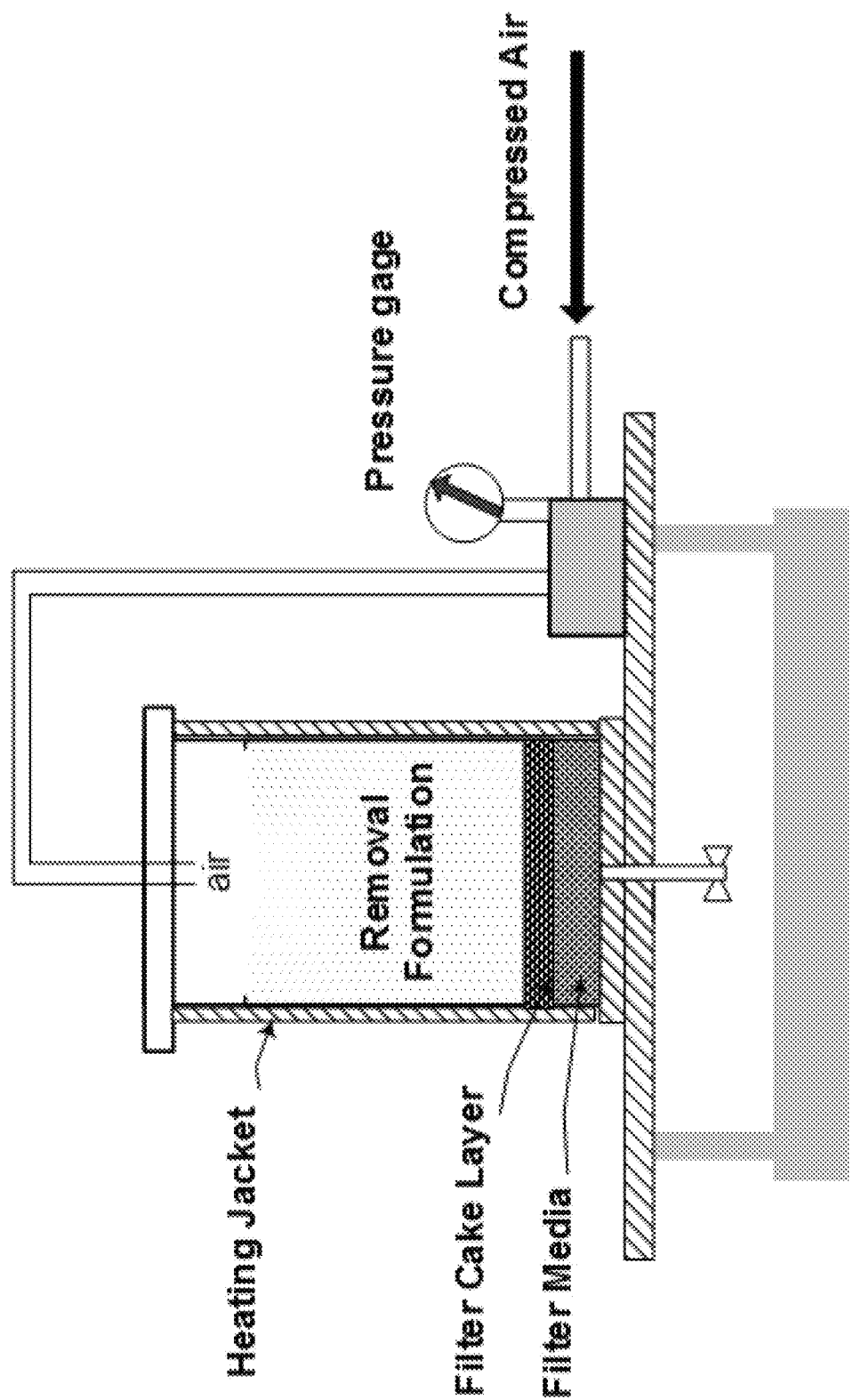
FIG. 1 shows a representation of the exemplary high pressure, high temperature (HPHT) filtration set-up used in testing as described herein.

Aspects of the invention provide wellbore filter cake removal compositions which may comprise, in an aqueous solution at a pH of at least 10, 10.5, 11, 11.5, 12, 12.5, 13, 13.5, or 14; 1 to 75 g of an ammonium salt per 100 mL composition; 1 to 75 g of nitrite salt per 100 mL composition; and at least 20 g ethylenediamine tetraacetic acid per 100 mL composition. The mass of ammonium and/or nitrite salt may independently be, e.g., at least 1, 2, 2.5, 3, 4, 5, 7.5, 10, 12.5, 15, 17.5, 20, 22.5, 25, 27.5, 30, 33, 35, 37.5, 40, 42.5, or 45 g and/or up to 75, 70, 65, 60, 55, 50, 45, 40, 35, 30, 27.5, 25, 22.5, 20, 17.5, or 15 g, per 100 mL of composition. The mass of ethylenediamine tetraacetic acid per 100 mL of composition may be, for example, at least 20, 21, 22, 22.5, 23, 24, 25, 26, 27, 27.5, 28, 29, 30, or 32 g and/or up to 35, 34, 33, 32.5, 32, 31, 30, 29, 28, 27.5, 27, 26, 25, 24, 23, 22.5, 22, 21, or 20 g. The nitrite salt and the ammonium salt may be in a molar ratio in a range of from 1.175 to 1 to 1 to 1.175, e.g., at least 1.175:1, 1.15:1, 1.125:1, 1.1:1, 1.075:1, 1.05:1, 1.025:1, 1:1, 0.975:1, 0.95:1, 0.925:1, or 0.9:1 and/or up to 1:1.175, 1:1.17, 1:1.165, 1:1.16, 1:1.155, 1:1.15, 1:1.125, 1:1.1, 1:1.075, 1:1.05, 1:1.025, 1:1, or 1:0.975. The ammonium salt may be an ammonium halide, e.g., fluoride, chloride, bromide, and/or iodide, and/or the nitrite salt may be an alkali metal salt, e.g., lithium, sodium, potassium, cesium, magnesium, calcium, strontium, and/or barium. The ethylenediamine tetraacetic acid may comprise a potassium counterion per molecule, e.g., at least 1, 1.1, 1.2, 1.25, 1.5, 1.75, 2, 2.25, 2.5, 2.75, 3, 3.25, 3.5, 3.75, or 4 potassium counterions per molecule.

Aspects of the invention provide methods of removal of filter cake mass from a wellbore wall in a subterranean formation using any permutation of the inventive composition(s) described herein. Such methods may comprise: introducing into a wellbore an aqueous composition onto a wellbore face coated with the filter cake mass; allowing the aqueous composition to reach a temperature in the wellbore sufficient to initiate an exothermic chemical reaction, e.g., at least 50, 55, 60, 65, 70, 75, 80, 85, 90, 95, or 100° C. and/or up to 150, 145, 140, 135, 130, 125, 120, 115, 110, 105, 100, 95, 90, or 85° C., of the components of the aqueous composition and thereby cause a temperature (e.g., at least 10, 25, 35, 50, 65, 75, 80, 85, 90, 95, 100, 105, 110, 125, or 150° C. up to 200, 175, 150, 125, 110, 100, 90, 80, or 75° C.) and/or pressure (e.g., at least 10, 25, 50, 75, 100, 125, 150, 200, 250, 350, 500, 650, 750, or 1000 psi and/or up to 10000, 7500, 5000, 3500, 2500, 2000, 1500, 1000, 900, 750, 650, 500, 450, 400, 350, 300, or 250 psi) surge at the wellbore face to disrupt the filter cake from the well bore face. The aqueous composition may comprise, at a pH of no less than 10, 10.33, 10.67, 11, 11.33, 11.67, 12, 12.33, 12.67, 13, 13.33, 13.67, or 14 (or any pH described herein): a first combination comprising a hydrated sulfate salt (e.g., mono, di, tri, tetra, penta, hexa, hepta, octa, nona, deca, undeca, dodecahydrate, or more) and guar or a polyacrylamide or a second combination comprising a nitrite salt and an ammonium salt; and at least 20, 20.5, 21, 21.5, 22, 22.5, 23, 23.5, 24, 24.5, 25, 25.5, 26, 26.5, 27, 27.5, 28, 28.5, 29, 29.5, or 30 wt. % (or any range or percent described herein) ethylenediamine tetraacetic acid, based on total aqueous composition weight.

In the second combination the ammonium salt and the nitrite salt may each be at a concentration in a range of from 0.5 to 15 M, particularly 1 to 5 M, e.g., at least 0.5, 0.75, 1, 1.25, 1.5, 1.75, 2, 2.25, 2.5, 2.75, 3, 3.5, 4, 4.5, or 5 M and/or up to 15, 12.5, 12, 11, 10, 9, 8, 7.5, 7, 6.5, 6, 5.5, 5, 4.75, 4.5, 4.25, 4, 3.75, or 3.5 M. The ammonium salt may be an ammonium halide, or otherwise comprise a non-reactive anion. The nitrite salt may be an alkaline metal or alkaline earth metal nitrite. The nitrite salt may comprise $Na^+$, $K^+$, $Li^+$, $Cs^+$, $Mg^{2+}$, $Ca^{2+}$, and/or $Ba^{2+}$ in the nitrite salt. The ammonium salt may comprise $F^-$, $Cl^-$, $Br^-$, $I^-$, $CO_3^{2-}$, $NO_3^-$, $ClO_4^-$, $HSO_4^-$, $SO_4^{2-}$, $H_2PO_4^-$, $HPO_4^{2-}$, $PO_4^{3-}$, and/or $^-OH$ in the ammonium salt. At least 95 wt. % of the nitrite salt may be sodium nitrite, relative to the total nitrite salt weight. At least 95, 96, 97, 97.5, 98, 99, 99.1, 99.5, or 99.9 wt. % of the ammonium salt may be ammonium chloride, relative to the total ammonium salt weight. A molar ratio of the ammonium salt to the nitrite salt may be in a range of from 1.175 to 1 to 1.175 to 1.

The first combination may be preferably used in some applications and may comprise: the polyacrylamide (e.g., with Mn of at least 10, 15, 20, 25, 30, 35, 40, 45, or 50 kDa and/or up to 100, 85, 75, 65, 55, 50, 45, 40, 35, 30, 25, or 20 kDa); and an alkaline metal or alkaline earth metal sulfate with saturated or at least 50, 60, 70, 75, 80, 85, or 90% saturated hydration sphere (e.g., mono, di, tri, tetra, penta, hexa, hepta, octa, nona, deca, undeca, dodecahydrate, or more). The hydrated sulfate salt may comprise $Na^+$ and/or $Mg^{2+}$ as the cation. The hydrated sulfate salt may be a combination of 2, 3, 4, 5, or 6 different hydrated sulfate salts. The hydrated sulfate salt may comprise at least 95, 96, 97, 97.5, 98, 99, 99.1, 99.5, or 99.9 wt. % $Na_2SO_4 \cdot 10H_2O$, relative to total sulfate salt weight. The hydrated sulfate salt may comprise at least 95, 96, 97, 97.5, 98, 99, 99.1, 99.5, or 99.9 wt. % $MgSO_4 \cdot 7H_2O$, relative to total sulfate salt weight.

The ethylenediamine tetraacetic acid may be in a range of from 22.5 to 30 wt. %, e.g., at least 22.5, 22.75, 23, 23.25, 23.5, 23.75, 24, 24.25, 24.5, 24.75, 25, 25.25, 25.5, 25.75, 26, 26.25, 26.5, 26.75, 27, 27.25, 27.5, 27.75, or 28 wt. % and/or up to 30, 29.75, 29.5, 29.25, 29, 28.75, 28.5, 28.25, 28, 27.75, 27.5, 27.25, 27, 26.75, 26.5, 26.25, 26, 25.75, 25.5, 25.25, or 25 wt. % (or any percent described herein), of the total aqueous composition weight. Each ethylenediamine tetraacetic acid molecule may comprise a potassium counterion, e.g., on average, 1, 1.1, 1.15, 1.2, 1.25, 1.33, 1.5, 1.67, 1.75, 1.85, 2, 2.2, 2.4, 2.5, 2.6, 2.8, 3, 3.1, 3.2, 3.3, 3.4, 3.5, 3.6, 3.7, 3.8, 3.9, or 4 $K^+$ counterions per molecule EDTA (or any average amount described herein).

The temperature in the wellbore may be in a range of from 50 to 150° C., such as at least 50, 55, 60, 65, 70, 75, 80, 85, 90, 95, or 100° C. and/or up to 150, 145, 140, 135, 130, 125, 120, 115, 110, 105, 100, or 95° C. (or any temperature described herein) prior to the introducing, i.e., before the thermochemical agent(s) release heat and/or pressure.

The wellbore may comprise a drilling fluid comprising at least 65, 67, 70, 72.5, 75, 77.5, or 80 wt. % and/or up to 95, 92.5, 90, 87.5, 85, 82.5, 80, 77.5, or 75 wt %, relative to all drilling fluid solids, of barite. Inventive methods may achieve the removal of at least 85, 86, 87, 88, 89, 90, 91, or 92 wt. % of the filter cake mass within 6 hours. Inventive methods may be ones in which at least 95, 95.5, 96, 96.5, 97, 97.5, 98, 98.5, 99, or 99.5% of the removal of the filter cake mass achievable by the method is within 6 hours.

Inventive materials do not require formation into pellets, spheres, cylinders, or the like, and/or require no pressurized treatment before reaction, e.g., no more than 4.5, 4, 2, 1, 0.75, 0.5, 0.25, 0.15, 0.102 MPa.

Inventive formulations may avoid foaming/blowing agent(s) and/or foam stabilizer(s) entirely, or contain no more than 5, 4, 3, 2.5, 2, 1, 0.5, 0.1, 0.01, 0.001, 0.0001, or 0.00001 wt. %, relative to total formulation weight, of such foaming agent(s) and/or stabilizer(s), individually or in combination, such as hydroxypropyl silicone (HPG), hydroxypropyl tannin, hydroxypropyl guar, xanthan gum (XG), hydroxyethyl cellulose (HEC), sodium dodecyl sulfate (AS), and/or betaine (AC), including ethoxylated alcohols, polysaccharides, ethoxylated fatty amines, amine oxides, glucosides, sulfonates, and/or quaternary ammonium salts. Inventive formulations may exclude acidic catalysts, or may comprise no more than 15, 10, 7.5, 5, 4, 3, 2, 1, 0.5, 0.1, 0.01, 0.001, 0.0001, or 0.00001 wt. %, relative to the total formulation weight, of acid catalysts, such as hydrochloric acid, hydroxyacetic acid, lactic acid, hydrofluoric acid, adipic acid, succinic acid, phosphoric acid, glutaric acid, 3-hydroxypropionic acid, carbonic acid, erythorbic acid, citric acid, salicylic acid, glycolic acid, acetic acid, propionic acid, formic acid, methanesulfonic acid, trifluoroacetic acid, trifluoromethanesulfonic acid, and/or tartaric acid. Inventive formulations may exclude N-acetic acid amino acids, or may comprise no more than 5, 4, 3, 2, 1, 0.5, 0.1, 0.01, 0.001, 0.0001, or 0.00001 wt. %, relative to the total formulation weight, of such N-acetic acid amino acids, e.g., glutamic acid N,N-diacetic acid, aspartic acid N,N-diacetic acid, methylglycine acid N,N-diacetic acid, and/or N-hydroxyethyl ethylenediamine-N,N',N'-tri acetic acid, and/or other chelating agents, such as citric acid, nitrilotriacetic acid (NTA), diethylene triamine pentaacetic acid (DTPA), propylene diamine tetraacetic acid (PDTA), ethylene diamine-N,N'-di(hydroxyphenyl) acetic acid (EDDHA), ethylene diamine-N,N'-di-(hydroxy-methyl phenyl) acetic acid (EDDHMA), sodium ethylenediamine-N,N-disuccinic acid (EDDS), ethanol diglycine (EDG), ethylene glycol-bis (β-aminoethyl ether)-N,N,N',N'-tetraacetic acid (EGTA), 2-hydroxyethyliminodiacetic acid (HEIDA), trans-1,2-cyclohexylene dinitrilotetraacetic acid (CDTA), ethylenediaminediacetic acid (EDDA), methylglycinediacetic acid (MGDA), glucoheptonic acid, gluconic acid, glutamic diacetic acid, sodium citrate, and/or phosphonic acid.

Inventive formulations may exclude mutual solvents, i.e., chemical additives soluble in oil, water, acids, and/or other well treatment fluids, e.g., lower alcohols (methanol, ethanol, 1-propanol, 2-propanol, etc.), glycols (ethylene glycol, propylene glycol, diethylene glycol, dipropylene glycol, polyethylene glycol, polypropylene glycol, polyethylene glycol-polyethylene glycol block copolymers, etc.), glycol ethers (2-methoxyethanol, diethylene glycol mono methyl ether, etc.), C2 to C2 esters, and C2 to C10 ketones, such as methyl ethyl ketone, methanol, or may contain no more than 5, 4, 3, 2.5, 2, 1, 0.5, 0.1, 0.01, 0.001, 0.0001, or 0.00001 wt. %, relative to total formulation weight, of these, individually or in combination. Inventive formulations can avoid oxidizing agents, such as peroxides, hypochlorites, hypobromites, peracids, persulfates, and/or persulfonic acids, or may comprise no more than 5, 4, 3, 2.5, 2, 1, 0.5, 0.1, 0.01, 0.001, 0.0001, or 0.00001 wt. %, relative to total formulation weight, of these, individually or in combination.

Inventive formulations may substantially exclude polymers, particularly polyionomers, or may comprise no more than 5, 4, 3, 2.5, 2, 1, 0.75, 0.5, 0.25, 0.1, 0.05, 0.01, 0.001, 0.0001, or 0.00001 wt. %, relative to total formulation weight, of such polymer(s), such as a hydrophobically modified polymer, acrylamido-tert-butyl sulfonate, hydrolyzed polyacrylamide, etc., individually or in combination.

Inventive formulations may exclude metallic catalysts and/or metal-containing catalysts, particularly transition metal (containing) catalysts, e.g., Y, Zr, Ti, V, Nb, Ta, Cr, Mo, W, Mn, Re, Fe, Ru, Os, Co, Rh, Ir, Ni, Pd, Pt, Cu, Ag, Au, Zn, Cd, In, Sn, Sb, Pb, and/or Bi, or may comprise no more than 25, 15, 10, 7.5, 5, 4, 3, 2.5, 2, 1, 0.75, 0.5, 0.25, 0.1, 0.05, 0.01, 0.001, 0.0001, or 0.00001 wt. %, relative to total formulation weight, of these, individually or in combination.

Relevant ammonium species may include, for example, ammonium acetate ($NH_4C_2H_3O_2$), ammonium azide ($NH_4N_3$), ammonium benzoate ($NH_4C_7H_5O_2$), ammonium bicarbonate ($NH_4HCO_3$), ammonium bromide ($NH_4Br$), ammonium carbonate ($(NH_4)_2CO_3$), ammonium chlorate ($NH_4ClO_3$), ammonium chloride ($NH_4Cl$), ammonium chromate ($(NH_4)_2CrO_4$), ammonium dichromate ($(NH_4)_2Cr_2O_7$), ammonium dihydrogen arsenate ($NH_4H_2AsO_4$), ammonium dihydrogen phosphate ($NH_4H_2PO_4$), ammonium fluoride ($NH_4F$), ammonium fluorosilicate ($(NH_4)_2SiF_6$), ammonium formate ($NH_4HCO_2$), ammonium hydrogen phosphate ($(NH_4)_2HPO_4$), ammonium hydrogen sulfate ($NH_4HSO_4$), ammonium iodate ($NH_4IO_3$), ammonium iodide ($NH_4I$), ammonium nitrate ($NH_4NO_3$), ammonium to oxalate ($(NH_4)_2C_2O_4$), ammonium perchlorate ($NH_4ClO_4$), ammonium perrhenate ($NH_4ReO_4$), ammonium phosphate ($(NH_4)_3PO_4$), ammonium selenate ($(NH_4)_2SeO_4$), ammonium sulfate ($(NH_4)_2SO_4$), ammonium aluminum sulfate ($NH_4Al(SO_4)_2$ or $NH_4Al(SO_4)_2.12H_2O$), ammonium sulfite ($(NH_4)_2SO_3$), ammonium tartrate ($(NH_4)_2C_4H_4O_6$), ammonium thiocyanate ($NH_4SCN$), ammonium thiosulfate ($(NH_4)_2S_2O_3$), etc.

Relevant nitrite species may include, for example, barium nitrite ($Ba(NO_2)_2$), calcium nitrite ($Ca(NO_2)_2$ or $Ca(NO_2)_2.4H_2O$), lithium nitrite ($LiNO_2$), potassium nitrite ($KNO_2$), sodium nitrite ($NaNO_2$), ammonium nitrite ($NH_4NO_2$), magnesium nitrite ($Mg(NO_2)_2$), strontium nitrite ($Sr(NO_2)_2$), zinc nitrite ($Zn(NO_2)_2$), silver nitrite ($AgNO_2$), etc.

The thermochemical agents may comprise $Na^+$, $K^+$, $Li^+$, $Cs^+$, $Mg^{2+}$, $Ca^{2+}$, and/or $Ba^{2+}$ with $NO_2^-$ and $NH_4^+$ with $F^-$, $Cl^-$, $Br^-$, $I^-$, $CO_3^{2-}$, $NO_3^-$, $N_3^-$, $ClO_4^-$, and/or $^-OH$.

As described herein, a filter cake (also referred to as a cake, mudcake, or wall cake) means the residue deposited on a permeable medium when a slurry, such as a drilling fluid, is forced against the medium under a pressure. The filter cake is a layer formed by solid particles in drilling mud against porous zones due to differential pressure between hydrostatic pressure and formation pressure. The filtrate is the liquid that passes through the medium, leaving the cake on the medium. Drilling muds are usually tested to determine the filtration rate and filter-cake properties. Filter cake properties, including cake thickness, toughness, slickness, and permeability, are important because the filter cake that forms on permeable zones in the wellbore can cause plugging, i.e., stuck pipe, and other drilling problems. Reduced oil and gas production can result from reservoir damage when a poor filter cake allows deep filtrate invasion. A degree of filter cake buildup is desirable to isolate formations from drilling fluids, however. In open hole completions in high-angle or horizontal holes, the formation of an external filter cake is preferable to a cake that forms partly inside the formation, which inside formations have higher potential for formation damage.

For the drilling operation, it may be preferable to have a filter cake that is impermeable and thin. Practically, the filter cake from API or HTHP fluid loss test should be less than or equal to 1/16 inch. If the drilling fluid is in poor shape, resulting in a thick filter cake in the wellbore, blocked pipe, stuck pipe and/or high torque/drag may occur. Thick filter cakes increase the contact area between drilling string or any kind of tubular. Drilling into permeable zones that are severely overbalanced risk the drill stem getting differentially stuck across these zones. Beyond the drilling string get stuck, the logging tool may also become stuck across permeable sands. If the drilling fluid/mud has a thick filter cake across the wall of the wellbore under dynamic conditions including drilling, working pipe, etc., torque will increase. A thick wall filter cake will also result in high drag while tripping out of the hole.

Aspects of the invention comprise using thermochemical reactions to remove the water-based and/or oil-based drilling fluid filter cake and designing the process to improve the removal efficiency in well cleanup in long horizontal wells.

Aspects of the invention include the removal of barite oil- and water-based filter cakes using a combined solution of thermochemical/EDTA chelating agent solution in one single stage. Aspects of the invention comprise use of 1:1 molar ratio of a thermochemical agent with 25 wt % EDTA chelating agent at pH 14 to yield 89% removal efficiency in barite water base filter cake and 83% removal efficiency in barite oil base filter cake in 6 hours. Aspects of the invention provide generating one or more pressure pulses, e.g., with one or more thermochemical reactions, optionally combined with temperature, to improve removal efficiency relative to unheated and/or thermochemical reaction-free conditions. Aspects of the invention include formulations allowing safe handling and/or minimizing corrosion risk, via localization of the reaction, the high pressure, and temperature (only) at the formation face.

EXAMPLES

Materials: Typical field formulations were used for the oil and water-based drilling fluids to form the filter cake, Tables 1 and 2 below list the composition of these fluids, wherein XC Polymer is a xanthan gum derivative of molecular weight 1016.8 g/mol, the chemical formula $C_{36}H_{58}O_{29}P_2$, the IUPAC name 6-[6-[6-(acetyloxymethyl)-2-[3-[3,4-dihydroxy-6-(hydroxymethyl)-5-phosphanyloxyoxan-2-yl]oxy-5-hydroxy-2-(hydroxymethyl)-6-(phosphanylmethyl)oxan-4-yl]oxy-4,5-dihydroxyoxan-3-yl]oxy-2-carboxy-4,5-dihydroxyoxan-3-yl]oxy-7,8-dihydroxy-2-methyl-4,4a,6,7,8,8a-hexahydropyrano[3,2-d][1,3]dioxine-2-carboxylic acid, used as an emulsion stabilizing and gelling agent.

TABLE 1

Drilling fluid formulation of the water-based drilling fluid.

| Additive | Amount | Unit |
|---|---|---|
| Water | 0.691 | bbl |
| Bentonite | 4 | lb |
| XC Polymer | 0.5 | lb |
| KOH | 0.5 | lb |
| KCl | 20.0 | lb |
| NaCl | 66 | lb |
| Barite | 352 | lb |
| CaCO₃ medium | 5.0 | lb |

TABLE 2

Drilling fluid formulation of oil-based drilling fluid.

| Name | Amount | Unit |
|---|---|---|
| Water | 12.28 | bbl |
| Oil | 24 | bbl |
| Calcite | 11 | lb |
| Barite | 42.2 | lb |
| KOH | 0.05 | lb |
| Polymer | 0.07 | lb |
| Viscosifier | 5 | lb |
| Emulsifier | 5.4 | lb |

Indiana limestone core samples of 2.0-inch diameter and 2.0-inch length were used as filter media to form the filter cake. A high pressure, high temperature (HPHT) coreflooding set-up was used to form the filter cake, and the same set-up was used to remove the filter cake or the drilling fluid residue. FIG. 1 shows the coreflooding set-up used in the Examples. The polymer is preferably a cellulosic, lignocellulose and/or aminated cellulosic, lignocellulose having quaternary amine groups. The emulsifier is, for example, Witcomul 3158 that reduces the interfacial tension between oil and water.

Two sets of thermochemical fluids, in addition to ethylenediaminetetraacetic acid (EDTA) chelating agent at pH of 14, preferably only the EDTA fluid is at a pH of 14, were used to remove the water and oil-based barite filter cake. The concentration of EDTA used in all experiments was 25 wt. % potassium salt of EDTA, i.e., $K_4EDTA$, because such a potassium salt can have higher dissolving power than the sodium salt. The filter cake for both oil and water-based drilling fluids was formed using the HPHT filtration equipment shown in FIG. 1. The same equipment was used to remove the filter cake.

Methodology: After the generation of the filter cake for two different drilling fluids (oil-based and water-based), the HPHT temperature cell was used to remove the drilling fluid residues (filter cake). The first set of thermochemical agents was magnesium sulfate, $MgSO_4$, in addition to a polymer, polyacrylamide or guar (the polyacrylamide has a molecular weight around 100,000 g/mol and a melting point around 250° C. The first set was mixed in a 300 mL water solution and placed in the HPHT cell above the rock sample covered by the drilling fluid residue. The cell was then heated to 100° C. at 500 psi pressure (nitrogen gas was used to apply the pressure). EDTA chelating agent at pH 14 was added to the thermochemical agent to a final EDTA concentration of 25 wt. %. The mixture was reacted, and the pressure and temperature inside the cell were monitored over time.

The second set of thermochemical agent included ammonium chloride, $NH_4Cl$, and sodium nitrite, $NaNO_2$, salts. The salts were prepared in one to one (1:1) molar ratio and mixed with EDTA chelating agent at pH of 14. The final concentration of EDTA chelating agent was 25 wt. % in the approx. 1M solution. Similar to the previous set, the reaction was triggered by heating the HPHT cell to 100° C. (the reaction can be triggered by a temperature as low as 50° C. but this will take longer time, i.e., at least one hour). Pressure and temperature profiles inside the cell were monitored over time. In this experiment, different molar concentrations of thermochemicals were used, e.g., 1 mol/L, 2 mol/L, 3 mol/L.

In-situ heat and pressure pulse can be generated by different methods. For example, heat and pressure can be generated by magnesium sulfate heptahydrate, $MgSO_4 \cdot 7H_2O$, and/or a combined solution of ammonium chloride (or other ammonium salts) and sodium nitrite (or other nitrite) salts. The magnesium sulfate has complications related to handling and storing in addition to the possibility of scale formation downhole. The ammonium-with-nitrite method is comparatively safe and easy to handle.

The ammonium-with-nitrite method can be used for different types of filter cakes and drilling fluid residues, insofar as the proper type of dissolver/solubilizer is selected in addition to the thermochemical agent(s). For example, in the case of calcium carbonate drilling fluid residue, chelating agents including $Na_4EDTA$, $Na_4GLDA$, and/or $Na_3HEDTA$, may be preferred to dissolve the calcium carbonate.

In the case that the downhole temperature is insufficient to trigger the reaction (or dehydration in the case of $MgSO_4 \cdot 7H_2O$), a second mechanism may be used in which an external buffer is used to trigger the reaction. Such external buffer may be a low pH chelating agent, such as HEDTA or GLDA. In the case of $MgSO_4 \cdot 7H_2O$, the initiation of the thermochemical activity requires a temperature of at least 100° C., then magnesium sulfate will dehydrate, releasing hot water or steam.

Referring now to the drawings, wherein like reference numerals designate identical or corresponding parts throughout the several views.

FIG. 1 shows the coreflooding set-up used in the Examples. The arrangement includes at least one inlet for compressed air, fed into a walled space, optionally through a valve including a pressure gage and/or further measurement interfaces. The compressed air is fed into a walled space or chamber, which may have a heating jacket integrated into its wall and/or penetrating into the space. The walled space may contain the removal formation upon a filter cake layer upon a filter medium or filter media, resting upon a base.

Effect of Initial Temperature on the Reaction Time

The chemical reaction of the exemplary thermochemical agents used in the Examples can be described by Equation 1 as follows:

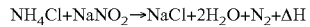

$$NH_4Cl + NaNO_2 \rightarrow NaCl + 2H_2O + N_2 + \Delta H \qquad \text{Eq. 1,}$$

wherein ΔH is the generated heat. The reaction in Eq. 1 requires heat to start, and the reaction time is a function of the initial temperature. The reaction (e.g., ratio of $NH_4Cl$ to $NaNO_2$) in Eq. 1, at one to one (1:1) molar ratio, generated an additional temperature of 90° C. and at two to two (2:2) molar ratio, i.e., twice the concentration, relative to EDTA, generated and additional temperature of 115° C. Different initial temperatures were used from 50 to 100° C., with these temperatures representing the downhole reservoir temperatures.

Figure 2:
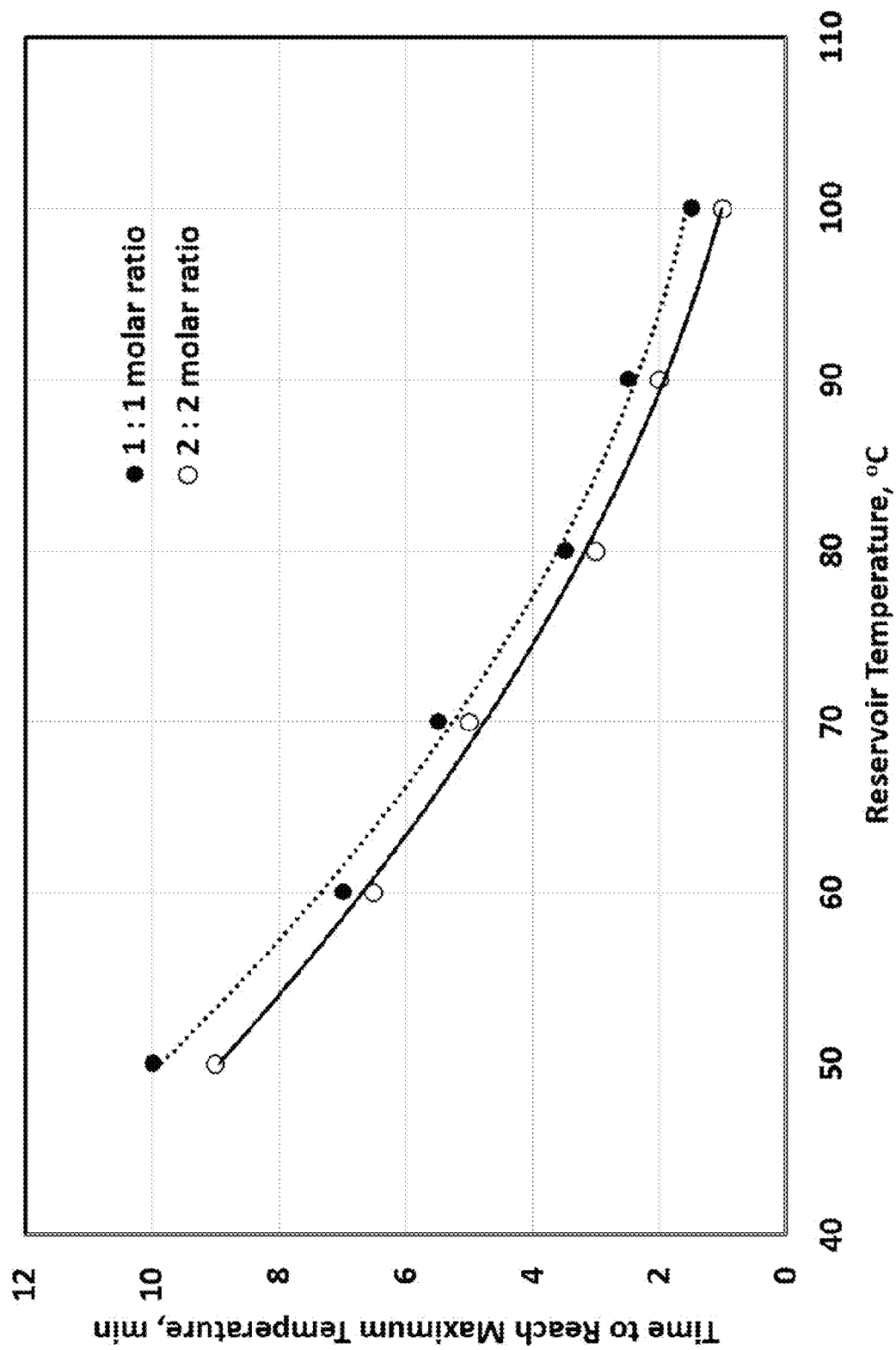
FIG. 2 shows a plot of the time to reach the maximum reaction temperature as a function of reservoir temperature using two exemplary injection formulations.

FIG. 2 shows the effect of reservoir temperature on the reaction time. As shown in FIG. 2, the duration of the reaction reaching the maximum temperature is a function of the initial reservoir or wellbore temperature at the time of reaction. The maximum generated temperature generally adds to the initial wellbore temperature. For example, in the case of a 1:1 molar ratio of thermochemical agents the relative to EDTA concentration may be 20-25 wt. %, the cell temperature reached 190° C. when the starting temperature was 100° C. The generated pressure in all cases reached 1500 psi and started to decline to 500 psi during the experiment, attributable to drilling fluid residue removal. The duration of the experiment was changed from 6 to 24 hours, and the drilling fluid residue removal efficiency was determined as a function of removal time. The removal efficiency was calculated by taking the disc weight before and after the removal process, and this difference was divided by the original disk weight (including the drilling fluid residue).

Possible Mechanisms of Drilling Fluid Residue Removal by Thermochemicals and Edta The experiments on the drilling fluid residue removal (filter cake) in both oil and water-based drilling fluids were conducted at an initial temperature of 100° C. and an initial pressure of 500 psi for different soaking times. Two different thermochemical molar concentrations relative to EDTA were tested, i.e., 1:1 and 2:2 molar ratios. The first set of experiments were conducted using the water-based drilling fluid.

Figure 3A:
FIG. 3A shows an oil-based barite filter cake before removal by an exemplary combined thermochemical-EDTA solution.
Figure 3B:
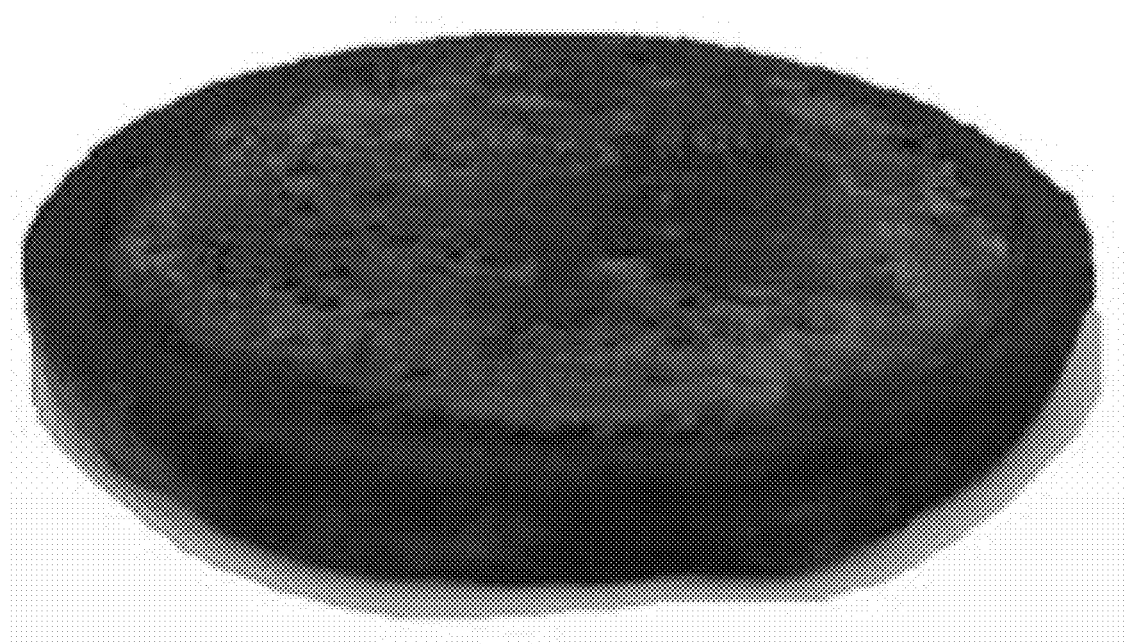
FIG. 3B shows oil-based barite filter cake after removal by an exemplary combined thermochemical-EDTA solution.
Figure 4A:
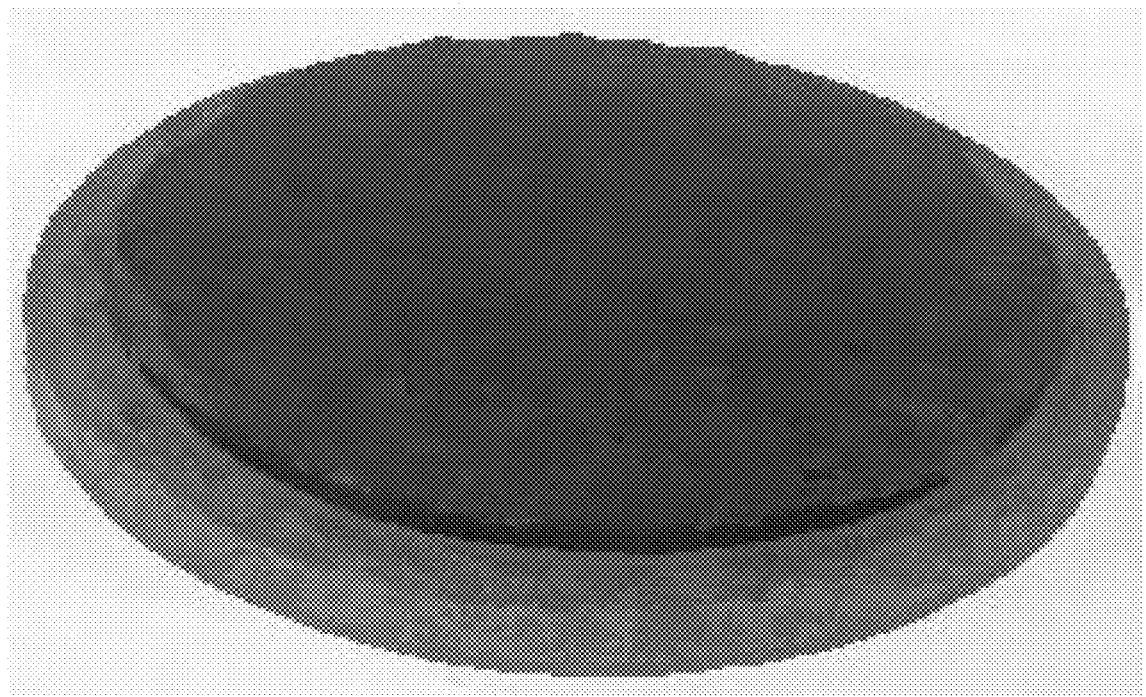
FIG. 4A shows a water-based barite filter cake before removal by combined thermochemical/EDTA solution.
Figure 4B:
FIG. 4B shows a water-based barite filter cake after removal by combined thermochemical/EDTA solution.

FIGS. 3A, 3B, 4A, and 4B show photos for oil-based barite filter cakes (FIGS. 3A and 3B) and water-based barite filter cakes (FIGS. 4A and 4B) that were formed and removed using the HPHT flooding equipment. FIGS. 3A to 4B show the results of using the exemplary 2:2 molar ratio thermochemical formulation combined with 25 wt % EDTA chelating agent. The removal efficiency reached 83% in the oil-based filter cake (FIG. 3B). The removal efficiency reached 89% in the water based filter cake (FIG. 4B).

The 2:2 molar ratio thermochemical reaction resulted in a final temperature of 210° C. after 10 minutes of reaction, and this thermal load needed 6 hours to dissipate to the cell temperature of 100° C. The reaction resulted in a final pressure of 1500 psi, which declined to 500 psi after 6 hours. The experimental time was 6 hours.

The resulting temperature from the 2:2 molar ratio thermochemical reaction caused some hydrolysis of the polymer covering the filter cake. In addition, the pressure disturbed the filter cake and removed the polymer form the surface. This process of polymer removal resulted in direct contact between the EDTA and barite. The resulting pressure pulse, i.e., 1500 psi, disturbed the filter cake as well as the polymer that covers the filter cake. This disturbance may have increased the surface area exposed for reaction with both the thermochemical agents and the EDTA chelating agent. The increase in temperature from 100 to 210° C. due to the thermochemical reaction resulted in higher barite solubility.

Figure 5:
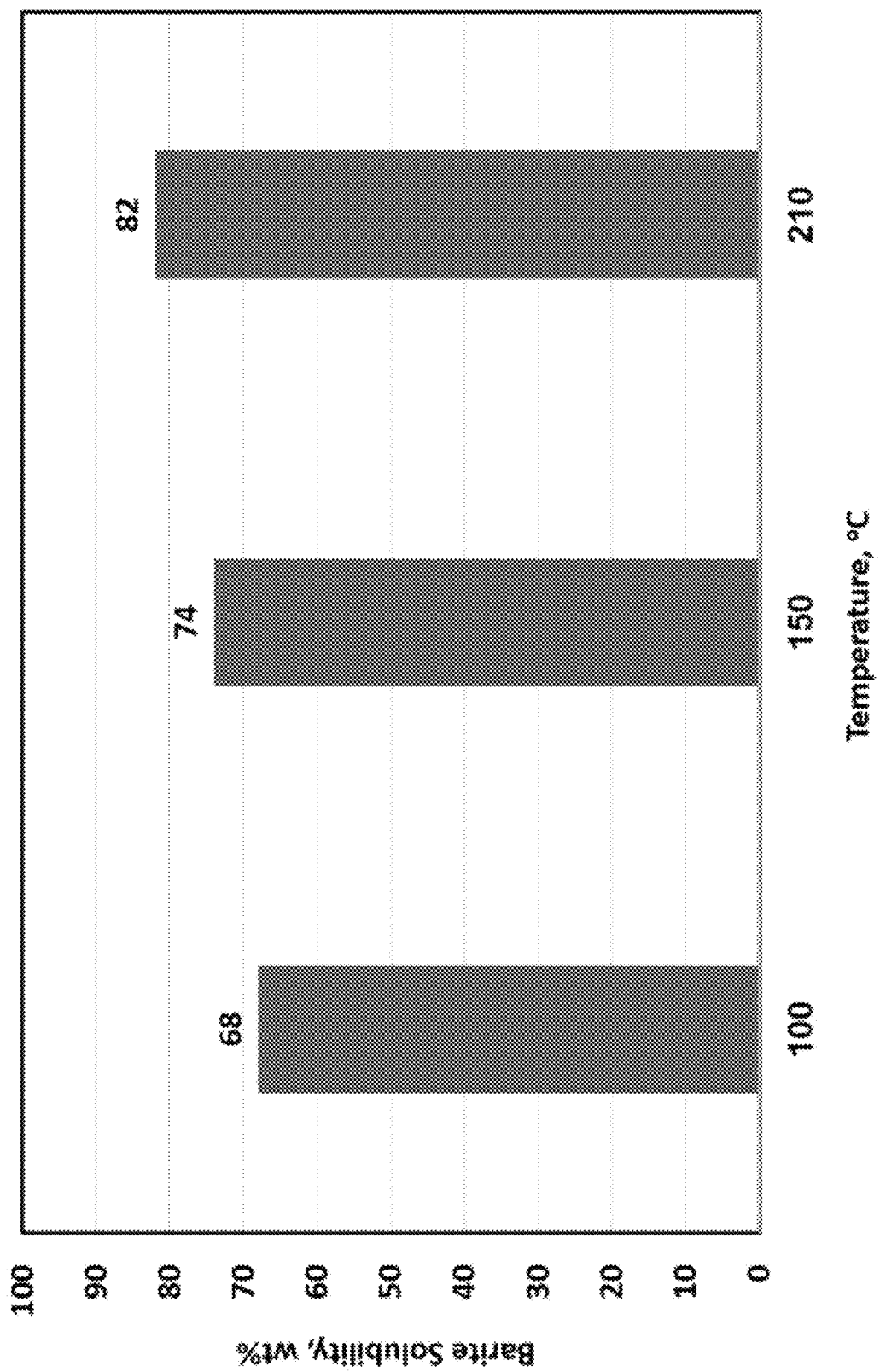
FIG. 5 shows a chart presenting barite solubility as a function of temperature in 25 wt. % EDTA at pH 14.

FIG. 5 shows the barite solubility as a function of temperature in 25 wt. % EDTA in water the final solution after adding thermochemical reactants at pH of 14. Increases in temperature correspondingly increased EDTA diffusion into the filter cake surface, and enhanced the dissolving power. In addition, increasing the temperature increased the reaction rate, allowing the filter cake to be removed in less time compared to low temperatures.

The increase in the barite solubility, i.e., dissolution rate, with increasing temperature may be explained by the reaction kinetics of the 25 wt. % $K_4EDTA$ solution with barite. Experiments on this reaction were conducted for barite discs using rotating disk apparatus, and more detail about the reaction kinetics of barite with chelating agents is described in *Energy and Fuels* 2018, 32, 9813-9821, and *SPE Drilling & Completion* 2019, 34(1), SPE-187122-PA (16-26), each of which is incorporated by reference herein in its entirety. The relationship between the dissolution rate of barite and the EDTA diffusion coefficient are shown below in Equation 2:

$$R_d = \frac{0.60248 \left(\frac{\mu_f}{\rho_f D_e}\right)^{-\frac{2}{3}} C_b \sqrt{\frac{\mu}{\rho}}}{1 + 0.2980 \left(\frac{\mu_f}{\rho_f D_e}\right)^{-\frac{1}{3}} + 0.1451 \left(\frac{\mu_f}{\rho_f D_e}\right)^{-\frac{2}{3}}} \omega^{\frac{1}{2}}, \qquad \text{Eq. 2}$$

wherein Rd is the reaction rate in mole/cm²·s, $\mu_f$ is the viscosity of the 25 wt. % $K_4EDTA$ in g/(s·cm), $\rho$ is the density of $K_4EDTA$ in g/cm³, $D_e$ is the diffusion coefficient in cm²/s, $C_b$ is the molar concentration of $K_4EDTA$ (0.75 M in this case), and $\omega$ is the disk rotational speed in Hz or s⁻¹. The effect of the generated temperature using thermochemical agents on the 25 wt. % $K_4EDTA$ diffusion coefficient was investigated at three different temperatures, i.e., 100, 125, and 150° C.

Figure 6:
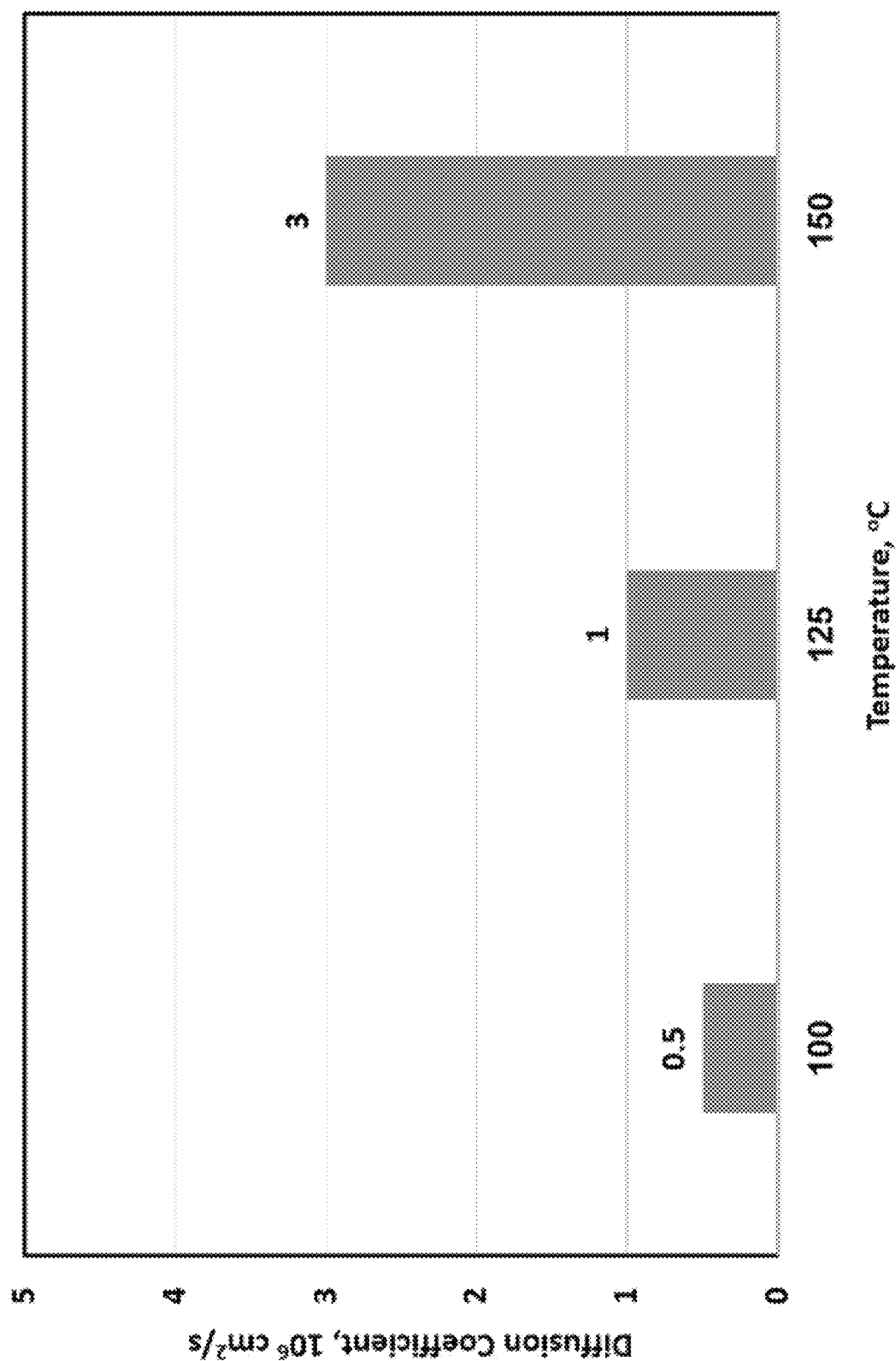
FIG. 6 shows a chart of the effect of temperature on the 25 wt. % EDTA diffusion coefficient.

FIG. 6 shows the diffusion coefficient at the temperatures 100, 125, and 150° C. The diffusion coefficient increased significantly with temperature which, in turn, was observed to increase the dissolution rate of barite filter cake.

The effect of a pressure pulse on the disturbance of the filter cake was studied by testing the filter cake solubility at 210° C. with and without thermochemical fluids at 1500 psi. All other parameters were held constant as if the thermochemical reaction were to proceed except for the pressure pulse. A second experiment was performed for comparison to the above experiment. The thermochemical-free experiment was conducted after the formation of the water-based barite filter cake using the HPHT cell. EDTA chelating agent at 25 wt. % concentration in water and pH of 14 was used at a temperature of 210° C. and a pressure of 1500 psi. This experiment was compared to the initial experiment that was conducted using the combined thermochemical-EDTA chelating agent solution. The filter cake removal efficiency for the second, thermochemical-free experiment was 75%, compared to 89% for the first case (using the thermochemical agents). These results support the conclusion that the pressure pulse generated by the thermochemical reaction disturbed the filter cake integrity and exposed more surface area for the reaction.

Figure 7:
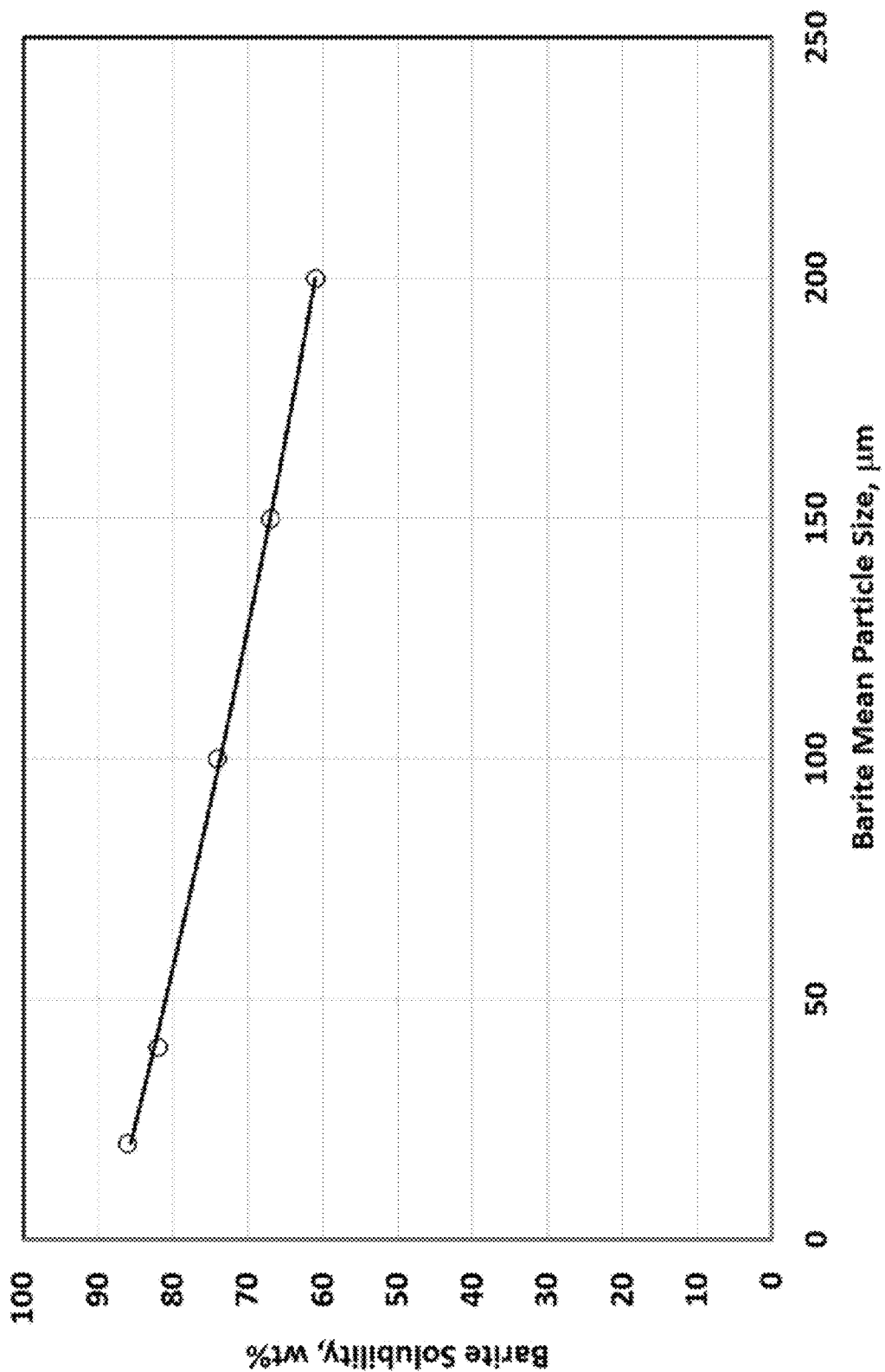
FIG. 7 shows a plot of the effect of average barite particle size on barite solubility in 25 wt. % EDTA at pH 14 at 210° C. for 6 hours.

FIG. 7 shows the effect of barite surface area on the reaction with 25 wt. % EDTA chelating agent at 100° C. The average particle size of the industrial barite that is typically used in drilling fluid preparation is 40 microns. Barite particle size has an effect on the barite solubility in 25 wt % EDTA chelating agent. The set of solubility experiments plotted in FIG. 7 were conducted at 210° C. for 6 hours using 25 wt. % EDTA at pH 14. Lower barite particle size yielded the highest solubility as shown in FIG. 7. A maximum barite solubility was obtained for a 40-micron size and the lowest solubility was for the largest particle size of 200-micron. Smaller particle sizes resulted in larger surface areas as is described by Equation 3, below:

$$SSA = \sum_{I=1}^{n} \frac{6}{d_i \rho} \left(\frac{w_i F}{100}\right), \qquad \text{Eq. 3}$$

wherein SSA is the specific surface area in m²/kg, $w_i$ is the weight percentage in size fraction i, F is the surface shape factor (between 1.1 and 1.15), $d_1$ is the geometric mean size of particle size fraction i in cm, p is the apparent density of the particle in kg/m³, and n is the number of size fractions.

The reaction rate of EDTA chelating with barite is affected by the surface area exposed to the reaction, which is likewise influenced by the particle surface area, which can be described by Equation 4, below:

$$R_m = r_m S_m \qquad \text{Eq. 4,}$$

wherein $R_m$ is the reaction rate of the mineral, $r_m$ is the specific reaction rate constant for the mineral, and $S_m$ is the mineral surface area. Equation 4 indicates that the reaction and solubility of barite mineral is a function of the surface area exposed for reaction.

Figure 8:
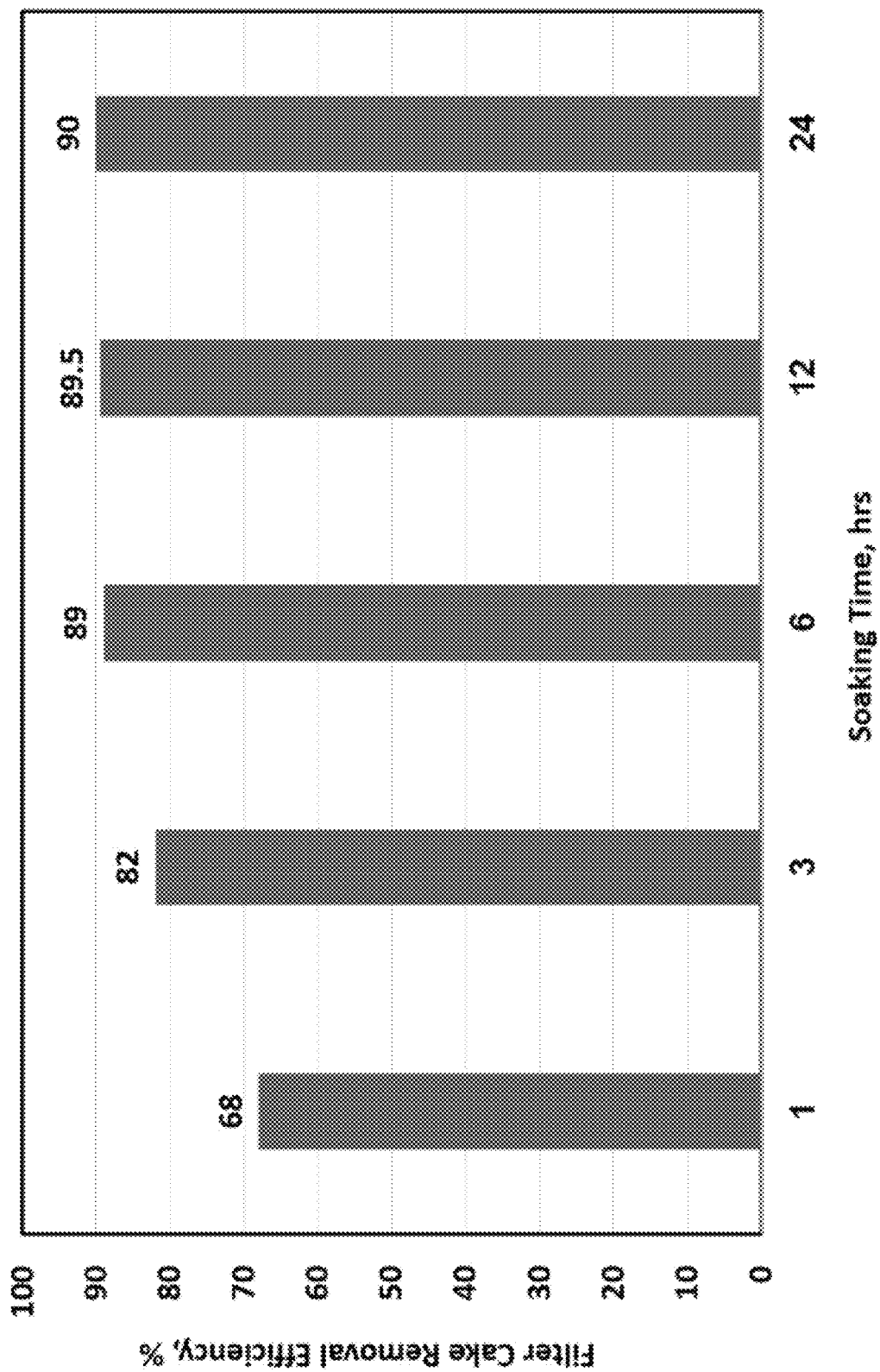
FIG. 8 shows a chart of the effect of soaking time on the barite filter cake removal efficiency (water based drilling fluid) in an exemplary formulation combining thermochemical agents and 25 wt. % EDTA solution at pH 14.

FIG. 8 shows the effect of exposure time on the filter cake removal. The removal efficiency in the experiments did not show significant change after 6 hours of reaction. This may be attributed to the fact that, after 6 hours, the 25 wt. % EDTA solution may have become saturated with barite thereby retarding further reaction with and/or solubilization of the existing barite in solution. As shown in FIG. 8, a substantially complete dissolution for the filter cake removal of barite weighted water-based drilling fluids using a combined thermochemical/EDTA treatment can be achieved by 6 hours.

The diffusion coefficient of EDTA chelating agent is a function of the barium concentration in solution. After 6 hours, the barium concentration reached 15,000 ppm. This high concentration, i.e., 15,000 ppm or 1.5%, retarded the reaction of EDTA and resulted in minor changes in the barite solubility at higher soaking times. The EDTA diffusion to the barite surface was indicated to be inversely proportional to the barite concentration in solution.

Numerous modifications and variations of the present invention are possible in light of the above teachings. It is therefore to be understood that within the scope of the appended claims, the invention may be practiced otherwise than as specifically described herein.

The invention claimed is:
1. A downhole wellbore filter cake removal composition, comprising:
    an aqueous solution; and
    a solid suspended in the aqueous solution,
    wherein the aqueous solution has a pH of at least 10, and comprises:
        1 to 75 g of an ammonium salt per 100 mL of the aqueous solution;
        1 to 75 g of a nitrite salt per 100 mL of the aqueous solution; and
        at least 20 g ethylenediamine tetraacetic acid per 100 mL of the aqueous solution,
    wherein the nitrite salt and the ammonium salt are in a molar ratio range of from 1.175:1 to 1:1.175, wherein the solid comprises:
   barite particles; and
   a cellulosic polymer,
      wherein the cellulosic polymer forms a layer on an outer surface of the barite particles,
      wherein the barite particles have an average size of 40 to 200 µm, and
   wherein the composition does not comprise an acid catalyst.

2. The composition of claim 1, wherein the ammonium salt is an ammonium halide, and
   wherein the nitrite salt is an alkali metal salt.

3. The composition of claim 2, wherein the ethylenediamine tetraacetic acid comprises a potassium counterion per molecule.

4. The composition of claim 1, comprising $Na_4EDTA$, $Na_4GLDA$, and $Na_3HEDTA$.

5. The composition of claim 1, wherein the ammonium salt and the nitrite salt are each at a concentration in a range of from 0.5 to 15 M in the aqueous solution.

6. The composition of claim 1, wherein the ammonium salt and the nitrite salt are each at a concentration in a range of from 1 to 5 M in the aqueous solution.

7. The composition of claim 1, comprising:
   at least one ion selected from the group consisting of $Na+$, $K+$, $Li+$, $Cs+$, $Mg2+$, $Ca2+$, and $Ba2+$ with the nitrite salt; and
   at least one ion selected from the group consisting of $F-$, $Cl-$, $Br-$, $I-$, $CO32-$, $NO3-$, $ClO4-$, $HSO4-$, $SO42-$, $H2PO4-$, $HPO42-$, $PO43-$, and $-OH$ with the ammonium salt.

8. The composition of claim 1, wherein the composition comprises
   at least 95 wt. % sodium nitrite for the nitrite salt, relative to total nitrite salt weight; and
   at least 95 wt. % ammonium chloride for the ammonium salt, relative to total ammonium salt weight.

9. The method of claim 1, wherein the ethylenediamine tetraacetic acid has a potassium counterion.

* * * * *